US012597287B2

(12) United States Patent
    Inoue

(10) Patent No.: US 12,597,287 B2
(45) Date of Patent: Apr. 7, 2026

(54) DISPLAY APPARATUS AND METHOD OF DRIVING DISPLAY APPARATUS

(71) Applicant: HUAWEI TECHNOLOGIES CO., LTD., Guangdong (CN)

(72) Inventor: Masahide Inoue, Osaka (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 653 days.

(21) Appl. No.: 18/148,030

(22) Filed: Dec. 29, 2022

(65) Prior Publication Data

US 2023/0132555 A1     May 4, 2023

Related U.S. Application Data

(63) Continuation of application No. PCT/CN2020/099979, filed on Jul. 2, 2020.

(51) Int. Cl.
    *G06V 40/13*      (2022.01)
    *G06V 10/143*     (2022.01)
    *G09G 3/32*       (2016.01)

(52) U.S. Cl.
    CPC ........ *G06V 40/1318* (2022.01); *G06V 10/143* (2022.01); *G09G 3/32* (2013.01); *G09G 2300/0842* (2013.01); *G09G 2380/08* (2013.01)

(58) Field of Classification Search
    CPC ....... G09G 2300/0842; G09G 2380/08; G09G 3/32; G06V 40/1318; G06V 10/145; G06V 10/143
    See application file for complete search history.

(56) References Cited

U.S. PATENT DOCUMENTS

| 9,741,286 B2 | 8/2017 | Sakariya et al. |
| 2014/0071295 A1 | 3/2014 | Miesak |

(Continued)

FOREIGN PATENT DOCUMENTS

| CN | 101135794 A | 3/2008 |
| CN | 108122941 A | 6/2018 |

(Continued)

OTHER PUBLICATIONS

International Search Report and Written Opinion in International Appln. No. PCT/CN2020/099979, mailed on Mar. 18. 2021, 10 pages.

(Continued)

*Primary Examiner* — Muhammad N Edun
(74) *Attorney, Agent, or Firm* — Fish & Richardson P.C.

(57) ABSTRACT

Example display apparatus and methods of driving display apparatus are described. One example display apparatus includes a plurality of light emitting elements, a drive circuitry, at least one processor, and one or more memories coupled to the at least one processor. The drive circuitry is configured to drive light emission of the plurality of light emitting elements. The one or more memories store programming instructions for execution by the at least one processor to process signals output from the plurality of light emitting elements irradiated with light without emitting. The light emitting elements include light emitting element groups that emit light with different wavelengths. A predetermined specific wavelength is detected based on output values of signals output from light emitting elements included in at least two groups of the plurality of light emitting element groups.

20 Claims, 16 Drawing Sheets

(56) References Cited

U.S. PATENT DOCUMENTS

| 2017/0169275 | A1 * | 6/2017 | Mackey | G09G 3/3426 |
| 2018/0157351 | A1 * | 6/2018 | Lee | G06F 3/042 |
| 2018/0357462 | A1 | 12/2018 | Mackey et al. | |
| 2019/0013368 | A1 * | 1/2019 | Chung | H10K 39/34 |
| 2019/0220649 | A1 * | 7/2019 | Zhu | H10K 59/122 |

FOREIGN PATENT DOCUMENTS

| CN | 108154804 | A | 6/2018 |
| CN | 109475328 | A | 3/2019 |
| JP | 2020086749 | A | 6/2020 |

OTHER PUBLICATIONS

Extended European Search Report in European Appln No. 20943029. 7, dated Jun. 7, 2023, 7 pages.

* cited by examiner

DISPLAY APPARATUS AND METHOD OF DRIVING DISPLAY APPARATUS

CROSS-REFERENCE TO RELATED APPLICATIONS

This application is a continuation of International Application No. PCT/CN2020/099979, filed on Jul. 2, 2020, the disclosure of which is hereby incorporated by reference in its entirety.

TECHNICAL FIELD

The present disclosure relates to a display apparatus and a method of driving a display apparatus and, more particularly, a display apparatus having a multi-spectrum photosensor and a method of driving the display apparatus.

BACKGROUND ART

Recently, technologies relating to handheld devices such as smartphones, tablets, and smart watches have been rapidly developed, and various functions have been installed in these devices. One of such functions is multi spectrum sensing. The multi spectrum sensing is realized by discrete photosensors, which include: an ambient color light sensor which is composed of RGB color photosensors; a proximity sensor which is composed of a near-IR light emitting diode (LED) and a photosensor, a heart rate monitor which is composed of a near-infrared (near-IR) LED and a photosensor; a vein sensor for finger/palm vein recognition which is composed of a near-IR LED and a photosensor array; and a finger print sensor. Here, the photosensors detect lights having different wavelengths depending on the application.

Typically, the display device has an active area surrounded by a border of a display module in which display driver circuits, buttons, cameras, and the like. The above-described discrete sensors are required to locate at the active area and/or the border of the display module according to these functions. However, mounting these individual sensors together at the active area or the border of the display module may impact the core requirements for display image quality. Further, addition of a large number of the discrete sensors has a problem in terms of cost.

SUMMARY OF INVENTION

It is an objective of the present invention to provide a display apparatus which can sense lights having multiple wavelengths by using light emitting devices on a display substrate.

According to a first aspect, there is provided a display apparatus, comprising:

a plurality of light emitting elements;

a drive unit configured to drive light emission of the plurality of light emitting elements; and a processing unit configured to process signals output from the plurality of light emitting elements irradiated with light without emitting, wherein the plurality of light emitting elements include a plurality of light emitting element groups that emit light with different wavelengths, and wherein the processing unit is configured to detect a specific wavelength based on output values of signals output from a light emitting element included in at least two groups of the plurality of light emitting element groups.

According to this implementation, various wavelengths can be detected based on output values of signals output from a light emitting element included in at least two groups of the plurality of light emitting element groups. Therefore, it is possible to realize multimedia sensors by using light emitting devices existing on a display substrate.

With respect to a possible implementation of the first aspect, the drive unit is configured to drive a first portion of the plurality of light emitting elements to emit light, and wherein the processing unit is configured to process a signal output from a second portion of the plurality of light emitting elements.

According to this implementation, the first portion of the plurality of light emitting elements is driven to emit light while a signal output from the second portion of the plurality of light emitting elements is processed. Therefore, sensing operation can be realized by combination of emission and sensing of the light emitting elements.

With respect to a possible implementation of the first aspect, the plurality of light emitting element groups includes a red light emitting element group, a green light emitting element group, a blue light emitting element group and an infrared light emitting element group.

According to this implementation, the light emitting element groups includes a red light emitting element group, a green light emitting element group, a blue light emitting element group and an infrared light emitting element group. Use of these light emitting element groups enable sensing not only red, green, blue and IR, but also yellow, magenta, cyan, and so on.

With respect to a possible implementation of the first aspect, the processing unit is configured to detect a red wavelength by subtracting the output value of the green light emitting element group from the output value of the red light emitting element group.

According to this implementation, the red wavelength can be detected by using the green and red light emitting element groups.

With respect to a possible implementation of the first aspect, the processing unit is configured to detect a green wavelength by subtracting the output value of the blue light emitting element group from the output value of the green light emitting element group.

According to this implementation, the green wavelength can be detected by using the blue and green light emitting element groups.

With respect to a possible implementation of the first aspect, the processing unit is configured to detect the yellow wavelength by subtracting the output value of the blue light emitting element group from the output value of the red light emitting element group.

According to this implementation, the yellow wavelength can be detected by using the blue and red light emitting element groups.

With respect to a possible implementation of the first aspect, the processing unit is configured to detect an infrared wavelength by subtracting the output value of the red light emitting element group from the output value of the infrared light emitting element group.

According to this implementation, the IR wavelength can be detected by using the IR and red emitting element groups.

With respect to a possible implementation of the first aspect, the drive unit is configured to drive light emission of a portion of the red light emitting element group and a portion of the green light emitting element group, and the processing unit is configured to detect a yellow wavelength based on an output value from another portion of the red light emitting element group.

According to this implementation, the yellow wavelength can be detected by using the red and green light emitting element groups.

With respect to a possible implementation of the first aspect, the drive unit is configured to drive light emission of a portion of the red light emitting element group and a portion of the green light emitting element group, and the processing unit is configured to detect a green wavelength based on an output value from another portion of the green light emitting element group.

According to this implementation, the green wavelength can be detected by using the red and green light emitting element groups.

With respect to a possible implementation of the first aspect, the drive unit is configured to drive light emission of a portion of the red light emitting element group and a portion of the blue light emitting element group, and the processing unit is configured to detect a magenta wavelength based on an output value from another portion of the red light emitting element group.

According to this implementation, the magenta wavelength can be detected by using the red and green light emitting element groups.

With respect to a possible implementation of the first aspect, the drive unit is configured to drive light emission of a portion of the red light emitting element group and a portion of the blue light emitting element group, and the processing unit is configured to detect a blue wavelength based on an output value from the green light emitting element group or another portion of the blue light emitting element group.

According to this implementation, the blue wavelength can be detected by using the red and blue light emitting element groups.

With respect to a possible implementation of the first aspect, the drive unit is configured to drive light emission of a portion of the green light emitting element group and a portion of the blue light emitting element group, and the processing unit is configured to detect a cyan wavelength based on an output value from a portion of the red light emitting element group or another portion of the green light emitting element group.

According to this implementation, the cyan wavelength can be detected by using the green and blue light emitting element groups.

With respect to a possible implementation of the first aspect, the drive unit is configured to drive light emission of a portion of the green light emitting element group and a portion of the blue light emitting element group, and the processing unit is configured to detect a blue wavelength based on an output value from another portion of the blue light emitting element group.

According to this implementation, the blue wavelength can be detected by using the green and blue light emitting element groups.

According to a second aspect, there is provided a method of driving a display apparatus, comprising:

driving light emission of multiple light emitting elements; and processing signals output from the plurality of light emitting elements that are irradiated with light without emitting, wherein the plurality of light emitting elements include a plurality of light emitting element groups that emit light with different wavelengths, and wherein the processing step comprises:

detecting a specific wavelength based on an output value of a signal output from a light emitting element included in at least two groups of the plurality of light emitting element groups.

According to this implementation, various wavelengths can be detected based on output values of signals output from a light emitting element included in at least two groups of the plurality of light emitting element groups. Therefore, it is possible to realize multimedia sensors by using light emitting devices existing on a display substrate.

With respect to a possible implementation of the second aspect, the driving step includes driving a first portion of the plurality of light emitting elements to emit light, and wherein the processing step processes a signal output from a second portion of the plurality of light emitting elements.

With respect to a possible implementation of the second aspect, the plurality of light emitting element groups include a red light emitting element group, a green light emitting element group, a blue light emitting element group and an infrared light emitting element group.

With respect to a possible implementation of the second aspect, the processing step comprises:

detecting a red wavelength by subtracting the output value of the green light emitting element group from the output value of the red light emitting element group.

With respect to a possible implementation of the second aspect, the processing step comprises:

detecting a green wavelength by subtracting the output value of the blue light emitting element group from the output value of the green light emitting element group.

With respect to a possible implementation of the second aspect, the processing step comprises:

detecting a yellow wavelength by subtracting the output value of the blue light emitting element group from the output value of the red light emitting element group.

With respect to a possible implementation of the second aspect, the processing step comprises:

detecting an infrared wavelength by subtracting the output value of the red light emitting element group from the output value of the infrared light emitting element group.

With respect to a possible implementation of the second aspect, the driving step includes driving light emission of a portion of the red light emitting element group and a portion of the green light emitting element group, and the processing step includes detecting a yellow wavelength based on an output value from another portion of the red light emitting element group.

With respect to a possible implementation of the second aspect, the driving step includes driving light emission of a portion of the red light emitting element group and a portion of the green light emitting element group, and the processing step includes detecting a green wavelength based on an output value from another portion of the green light emitting element group.

With respect to a possible implementation of the second aspect, the driving step includes driving light emission of a portion of the red light emitting element group and a portion of the blue light emitting element group, and the processing step includes detecting a magenta wavelength based on an output value from another portion of the red light emitting element group.

With respect to a possible implementation of the second aspect, the driving step includes driving light emission of a portion of the red light emitting element group and a portion of the blue light emitting element group, and the processing step includes detecting a blue wavelength based on an output value from the green light emitting element group or another portion of the blue light emitting element group.

With respect to a possible implementation of the second aspect, the driving step includes driving light emission of a portion of the green light emitting element group and a portion of the blue light emitting element group, and the processing step includes detecting a cyan wavelength based on an output value from a portion of the red light emitting element group or another portion of the green light emitting element group.

With respect to a possible implementation of the second aspect, the driving step includes driving light emission of a portion of the green light emitting element group and a portion of the blue light emitting element group, and the processing step includes detecting a blue wavelength based on an output value from another portion of the blue light emitting element group.

The present disclosure realizes multi spectrum photosensing by using common light emitting elements, which are used not only for emission device for a micro LED display, but also for photosensing. For example, display emission devices such as LEDs can be commonly utilized as a photosensor on a micro LED display. Therefore, it is not necessary to define an additional sensor area for display architecture which causes design constraint. Also, there is no need for additional cost for sensors.

Further, multi-spectrum sensing is effective to reduce ambient optical noise, like room light, infrared (IR) light by a thermal equipment, etc.

BRIEF DESCRIPTION OF DRAWINGS

To describe the technical solutions in the embodiments more clearly, the following briefly describes the accompanying drawings required for describing the present embodiments. Apparently, the accompanying drawings in the following description depict merely some of the possible embodiments, and a person of ordinary skill in the art may still derive other drawings, without creative efforts, from these accompanying drawings, in which.

DESCRIPTION OF EMBODIMENTS

To make persons skilled in the art understand the technical solutions in the present disclosure better, the following clearly and completely describes the technical solutions in the embodiments of the present disclosure with reference to the accompanying drawings. Apparently, the described embodiments are merely a part rather than all of the embodiments of the present disclosure. All other embodiments obtained by persons of ordinary skill in the art based on the embodiments of the present disclosure without creative efforts shall fall within the protection scope of the present invention.

Terms used in the embodiments of this application are merely used to explain specific embodiments of this application, but are not intended to limit this application.

First Embodiment

Figure 1:
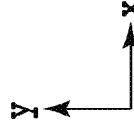
FIG. 1 is a block diagram showing a configuration example of a display apparatus according to an embodiment.

FIG. 1 is a block diagram showing a configuration example of a display apparatus according to the first embodiment of the present disclosure. A display apparatus 100 may be an active matrix display that includes a two-dimensional matrix of display elements. The display apparatus 100 includes a pixel array 104 which has a plurality of pixel circuits arranged in a two-dimensional form (matrix form) of N rows by M columns. Each pixel may include multiple subpixels that emit different colors of lights. In the case of a red-green-blue (RGB) subpixel arrangement, each pixel includes three subpixels that emit red (R), green (G), and blue light (B), respectively. Also, in the case of an alternative red-green-blue-infrared (RGBIR) arrangement, each pixel includes four subpixels that emit red, green, blue, and infrared light, respectively.

A write controller 101 that supplies a pixel drive signal is arranged on one end side (left side in the figure) of the pixel array 104. The pixel array 104 and the write controller 101 are connected by write signal lines 102. In addition, a signal converter 106 connected to individual data signal lines 105, and a scanning circuit 107 are arranged on a lower end side (lower side in the figure) of an imaging region.

The display apparatus 100 includes a controller 103. The controller 103 generates and outputs a master clock or a clock obtained by dividing the master clock, based on the master clock. The write controller 101, the signal converter 106, and the scanning circuit 107 are controlled in synchronization with the clock output from the controller 103. The controller 103 is connected to a graphical processing unit (GPU) 111 and a memory 109, and performs control based on data stored in the memory 109 under regulation by the GPU 111.

The write controller 101 sets an address, and drives emission signal lines 110 to perform vertical scanning. The emission signal lines 110 are arranged along an x-axis, and each supplies emission signals to a plurality of LEDs. The signal converter 106 performs signal conversion processing such as converting an analog output of a pixel into a digital output, and outputs the digital output to a processing unit 108. The scanning circuit 107 sequentially selects each signal conversion unit of the signal converter 106 in synchronization with the clock output from the controller 103, and controls the signal converter 106 to read signals from data signal lines 105 and output the signals to the processing unit 108. In one embodiment, the signal converter 106 may include an AFE (Analog Front End) for amplification and conditioning to provide an appropriate signal to an analog to digital converter (ADC).

In one embodiment, the pixel array 104 may be driven by a write driver 112 and the write controller 101. The write controller 101 may select a row of the pixel array 104 at a time by providing an ON voltage to the selected row. The selected row may be activated to receive pixel image data (the emission signal) from the write driver 112 as will be discussed further below. The write driver 112 and the write controller 101 are controlled by the controller 103. The controller 103 may provide the write controller 101 with a write control signal indicating which row is to be selected. The controller 103 may also provide the write driver 112 with the emission signal in the form of a row of data voltages. Each data voltage may drive a corresponding subpixel in the selected row to emit a colored light.

The pixel array 104 is also driven by the signal converter 106 and a sense controller 113. The sense controller 113 may select one row of the pixel array 104 at a time by providing an ON voltage to the selected row. The selected row may be applied reverse bias, by the signal converter 106 in order for the selected row to sense light. Output data from the selected row may be detected by the signal converter 106 in the form of data voltage or current signals corresponding to the intensity of light sensed by each subpixel in the selected row. These signals may be calculated by a voltage or current calculator, such as a digital to analog converter and a charge amplifier located in the signal converter 106. The signal converter 106 may present sensing data to the processing unit 108. The controller 103 may provide the sense controller 113 with a sense control signal indicating which row is to be selected next for sensing light. The controller 103 may also present a reverse bias signal to the signal converter 106 to indicate a reverse bias voltage such as no bias voltage or a reverse bias voltage applied to each subpixel in the selected row for sensing light.

In the present embodiment, an LED that emits red light (hereinafter, referred to as LED (R)), an LED that emits green light (hereinafter, referred to as LED (G)), and an LED that emits red light (hereinafter, referred to as LED (R)) are grouped together. Each of the grouped LEDs is called a light emitting element group. Then, the processing unit 108 may detect a specific wavelength based on the output value of the signal output from the light emitting element included in at least two groups of the plurality of light emitting element groups.

Figure 2:
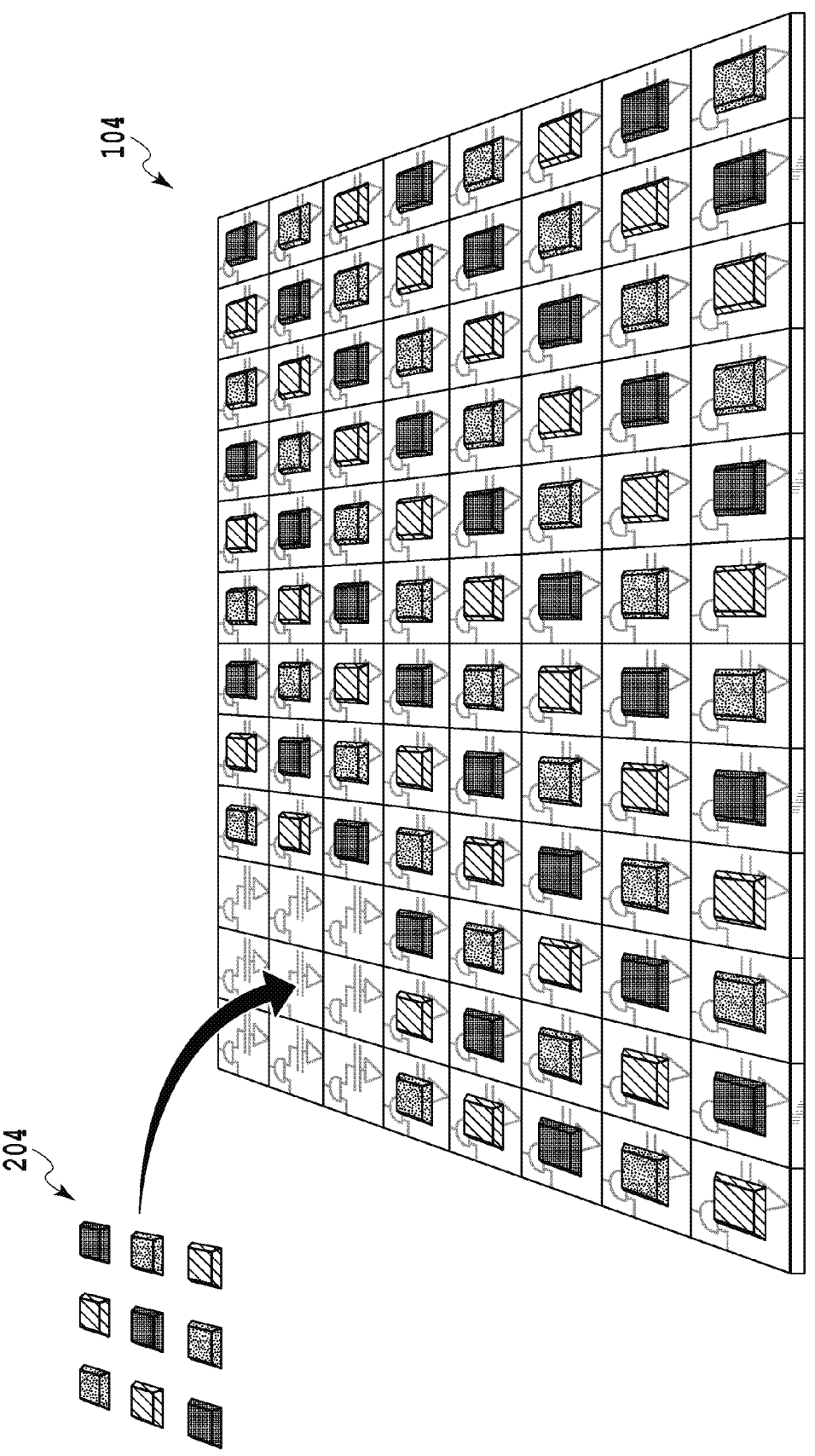
FIG. 2 is a mounting method of a pixel array illustrated in FIG. 1.

FIG. 2 illustrates a mounting method of the pixel array illustrated in FIG. 1. In manufacturing a micro LED, an LED chip 204 composed of nine LEDs, which is a combination of three LEDs (R), three LEDs (G), and three LEDs (B), is manufactured. Then, a pixel array 104 is formed by arranging a plurality of LED chips 204 on a backplane having a driving circuit. The pixel array 104 is configured as a micro LED display.

The pixel circuit constituted by a combination of an LED and an active pixel sensor (APS) according to the present embodiment may be applied to various electronic devices such as a smartphone, a personal digital assistant (PDA), a cellular phone, and a personal computer (PC).

Figure 3:
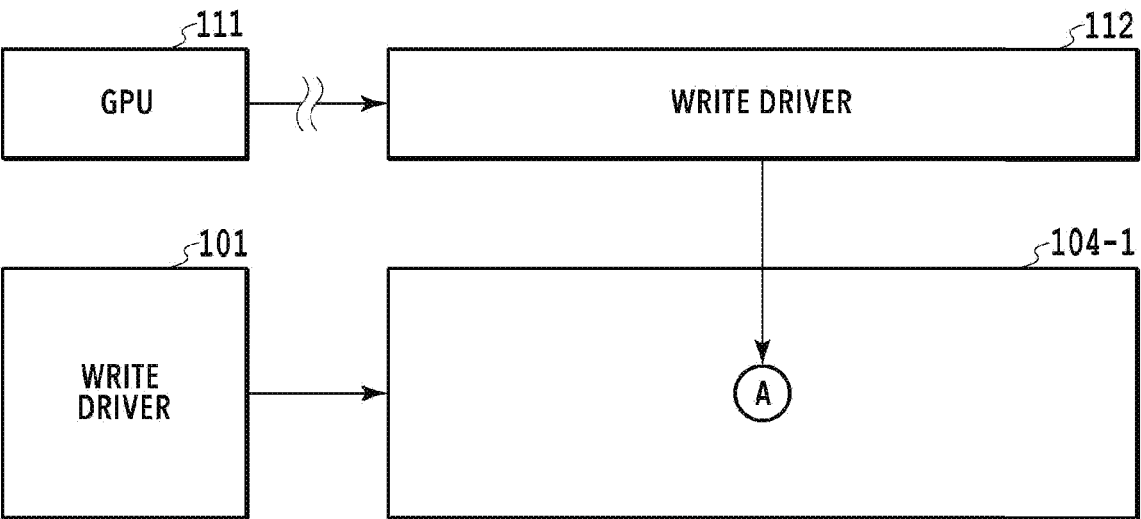
FIG. 3 is an embodiment of the pixel array and its operation.
Figure 4:
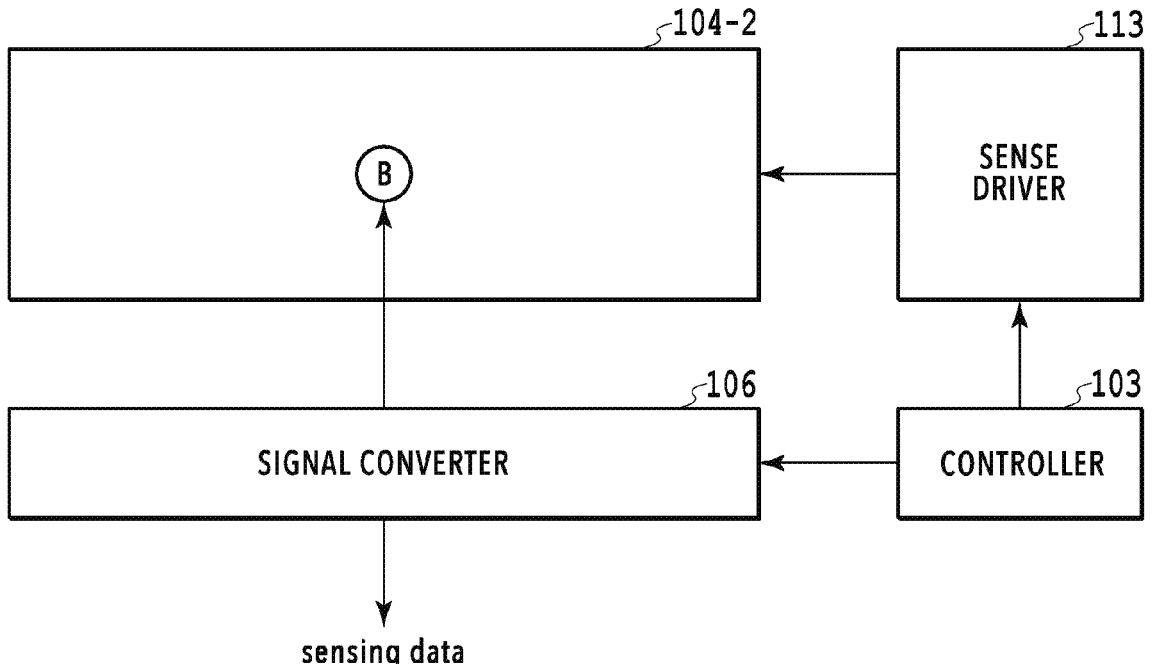
FIG. 4 is an embodiment of the pixel array and its operation.

FIGS. 3 and 4 illustrate an embodiment of the pixel array 104 and its operation with the write controller 101 and sense controller 113 in detail. The pixel array 104 has two modes: an emitting mode and a sensing mode. In FIG. 3, the pixel array 104 is in the emitting mode and a selected write row 104-1 is written with new data. On the other hand, FIG. 4 shows the pixel array in the sensing mode. In the sensing mode, a selected sense row 104-2 is used to sense light while rows above and below the selected sense row 104-2 are used to emit light. During emitting and sensing operation, the selected rows 104-1 and 104-2 scroll sequentially from the top row to the bottom row of the pixel array 104.

For the selected write row 104-1, the controller 103 sends the write control signal from the write driver 112 and the GPU 111 sends emission signal 110 to the write driver 112. The write control signal may directly address a row in the pixel array 104 to specify a row for writing data, or may prompt the write controller 101 to select the next row in sequential order. In order to select a row to write data, the write controller 101 may output an ON voltage to directly select a row 104-1 of the pixel array 104 based on an input row index. The emission signal may specify the brightness of each LED in the selected row 104-1 during emission. Once the write driver 112 receives the emission signal, it may divide the signal according to each pixel to each corresponding pixel indicated by a character "A" in the selected write row 104-1. A write control signal may be sent to each subpixel within a pixel A to allow a pixel image data corresponding to the emission signal to be stored on a storage capacitor within a subpixel driving circuit.

In order for the selected sense row 104-2 to be operated in the sensing mode to sense light, the controller 103 may send a sense control signal to the sense controller 113 and a reverse bias signal to the signal converter 106. The sense control signal may specify a row index to directly address a row in the pixel array 104 for sensing light, or may prompt the sense controller 113 to select the next sensing row in sequential order. In order to select a row for sensing light, the sense controller 113 may output an ON voltage to directly select a selected sense row 104-2 of the pixel array 104 based on an input row index. Once the selected sense row 104-2 is selected, a sense signal may be sent to each pixel in the selected sense row 104-2 to select a sensing circuit, such as the signal converter 106. The signal converter 106 may operate the selected sense row 104-2 in the sensing mode by applying a reverse bias voltage to an LED in each pixel indicated by a character "B" in the selected sense row 104-2 through a biasing and sensing line. In an embodiment, the signal converter 106 may operate the selected sense row 104-2 in the sensing mode by applying a reverse bias voltage or zero bias voltage to an LED in each pixel B in the selected sense row 104-2. The signal converter 106 may determine the potential of the reverse bias voltage using the reverse bias signal sent from the sense controller 113. Once the LED is reverse biased, light received by the LED may create a voltage change or a current flow back through the biasing and sensing line as sensing output data. In an embodiment, the reverse bias voltage and sensing data flow through the same physical line. The signal converter 106 may interpret the sensing data with sensing circuitry such as analog to digital converters and charge amplifiers to form sensing data. Thereafter, the signal converter 106 relays corresponding sensing data to the controller 103.

Figure 5:
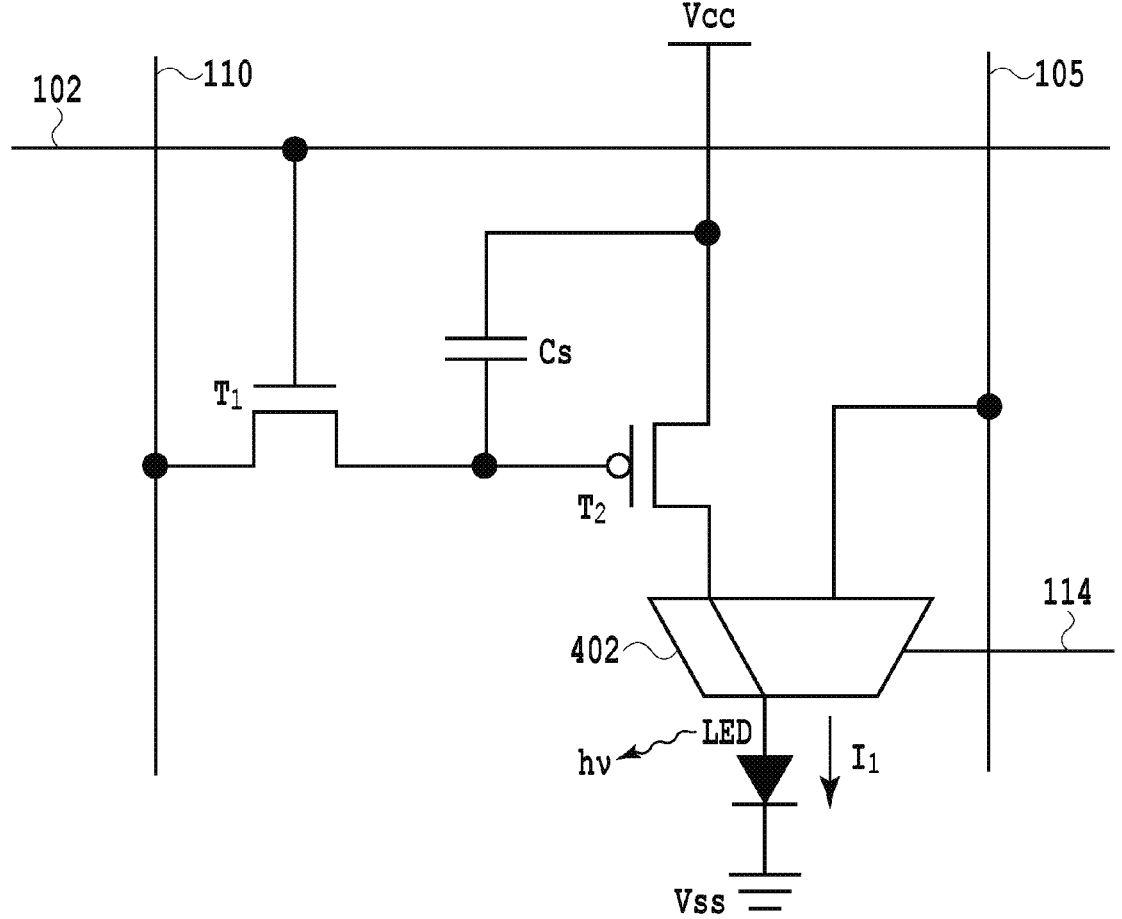
FIG. 5 is an exemplary circuit diagrams for forward biasing an LED in accordance with an embodiment.
Figure 6:
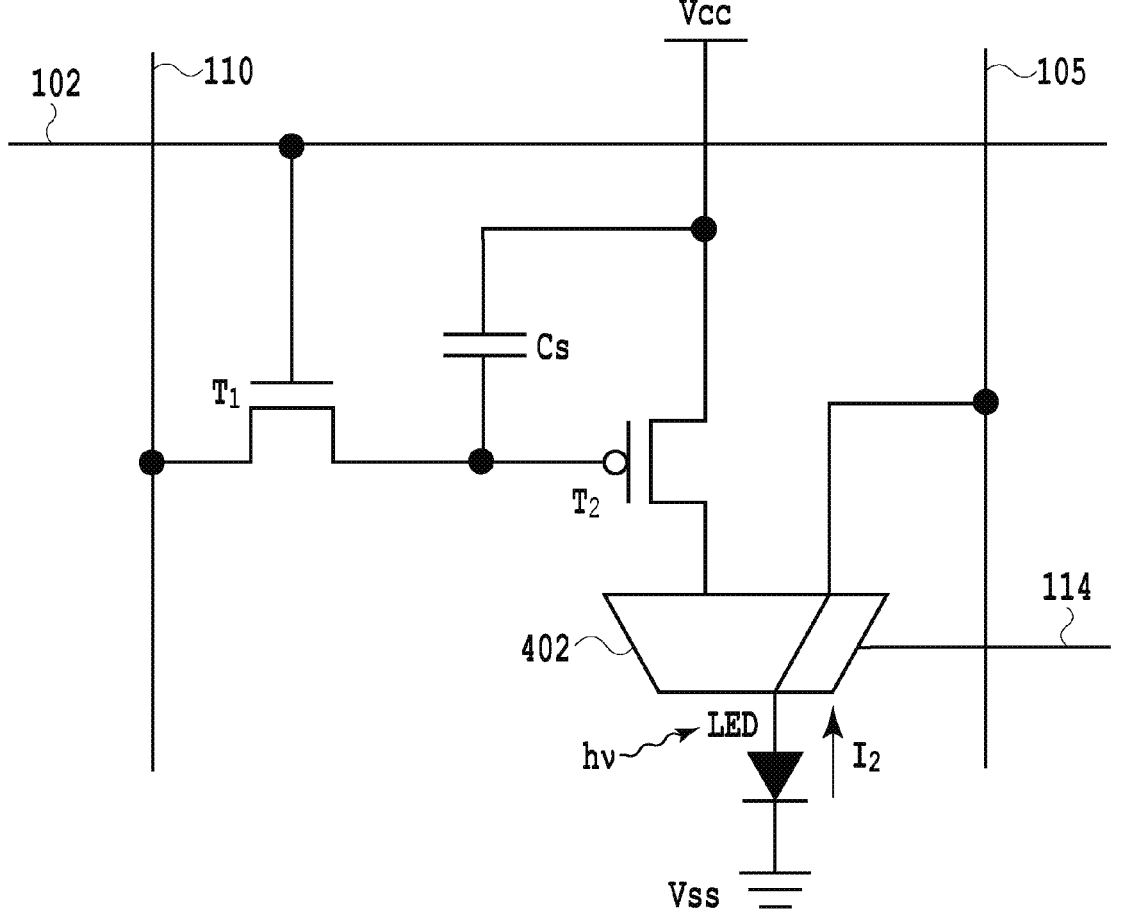
FIG. 6 is an exemplary circuit diagrams for reverse biasing an LED in accordance with an embodiment.

FIGS. 5 and 6 illustrate exemplary circuit diagrams for forward biasing and reverse biasing an LED in accordance with an embodiment. FIGS. 5 and 6 illustrate 2T1C driving circuits to show how the driving and sensing circuits operate together.

During operation, a LED may be forward biased to emit light and reverse biased to sense light depending upon the electrical connection made by the selection device 402. In FIG. 5, a subpixel is written with pixel image data and the LED is forward biased to emit light. A write signal from the write signal line 102 may be activated to apply a voltage to a gate of a switching transistor T1. The activated write signal may turn on the switching transistor T1 to apply a pixel image data voltage from an emission signal line 110 to a storage capacitor Cs, which may store the image data voltage. Then, the write signal may be deactivated to turn off the switching transistor T1, which now completes writing to the subpixel. In order to emit light, a deactivated sense signal may be sent to a selection device 402 to connect the driving transistor T2 to an LED. Although the selection device 402 is a multiplexer, it may be a selection transistor or a pair of transistors, or any other selection device. The storage capacitor Cs may turn on the driving transistor T2 with the stored image data voltage to allow a corresponding driving current I1 to flow across the driving transistor T2 and through the LED. Accordingly, the driving current I1 causes the LED to be operated in the emitting mode to emit light with a brightness corresponding to the magnitude of the image data voltage.

FIG. 6 illustrates operation of driving an LED in reverse bias and sensing light from the LED. The selection device 402 may select the data signal line 105 to select and electrically couple the LED to the data signal line 105 in response to an activated sense signal from a switching line 114. A reverse bias voltage such as a reverse or zero bias voltage may be applied to the LED from the signal converter 106 through the data signal line 105 to operate the LED in the sensing mode. For example, data signal line 105 is driven with a negative potential, which results in a reverse biasing of LED. In reverse bias mode, charge accumulates on the anode and cathode of the LED from the reverse bias voltage and causes the LED to be sensitive to light. In zero bias mode, the data signal line 105 is not driven with any voltage such that charge accumulates on the anode and cathode of the LED from exposure to light. As external light is irradiated on the reverse biased LED, a corresponding sensing signal in the form of a current I2 is induced across the LED and through the data signal line 105. Accordingly, the sensing signal may flow through the data signal line 105 with a magnitude corresponding to the intensity of light sensed by the LED.

Figure 7:
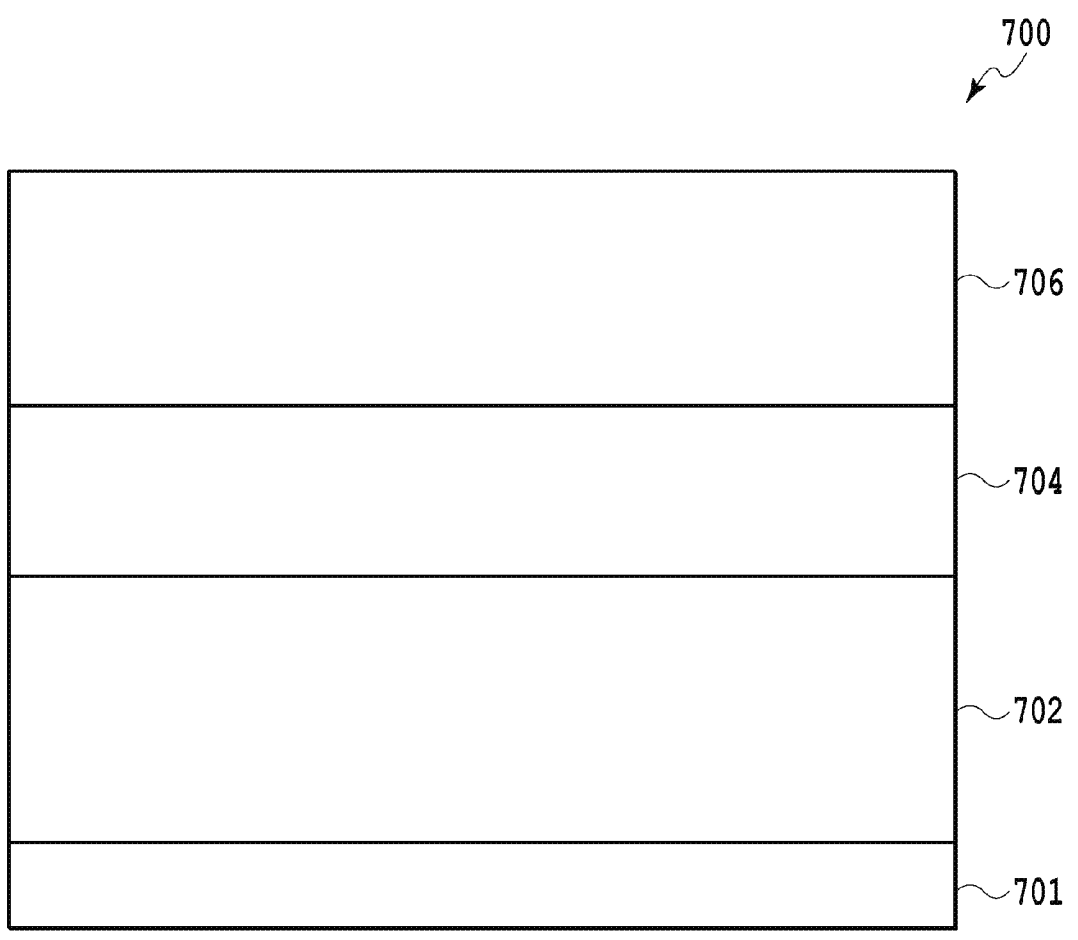
FIG. 7 is an example of a quantum well structure used in an LED.

FIG. 7 shows an example of a quantum well structure used in an LED. The quantum well structure 700 shown in the figure is configured by laminating an n-clad layer 702, an active layer 704, and a p-clad layer 706 on a substrate 701. In the quantum well structure 700, a quantum well is formed by sandwiching the active layer 704 having a small band gap with the n-clad layer 702 and the p-clad layer 706 having a band gap, and carriers (electrons, holes) are confined in the active layer 704. Light efficiently.

Figure 8A:
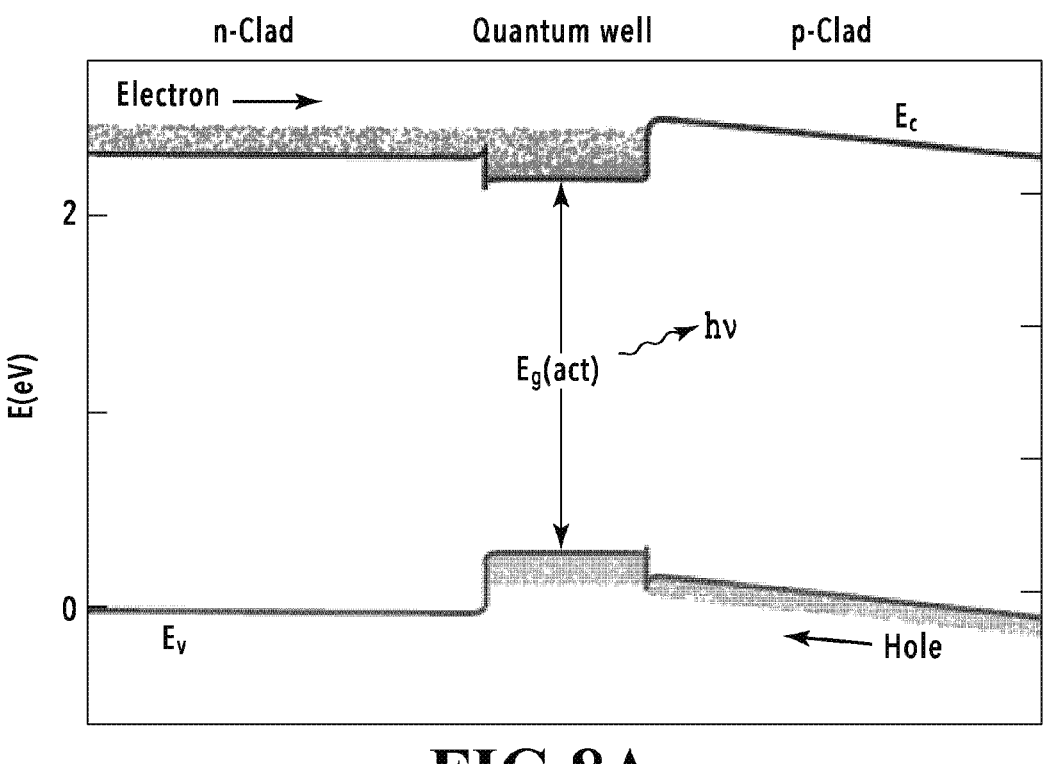
FIG. 8A is a diagram illustrating a principle of operation of the LED shown in FIG. 7.
Figure 8B:
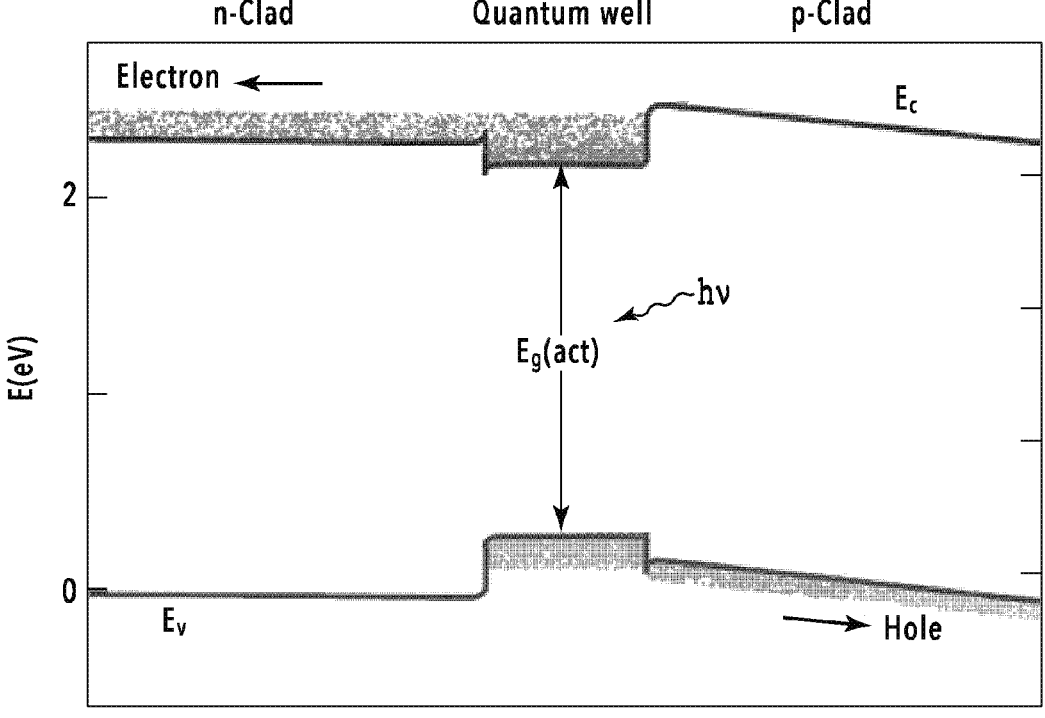
FIG. 8B is a diagram illustrating the principle of operation of the LED in a detection mode.

FIG. 8A is a diagram illustrating the principle of operation of the LED shown in FIG. 7 in the light emission mode. In the figure, the vertical axis represents the energy E (eV) and the horizontal axis represents the position on the quantum well structure. The upper curve shows the energy Ec at the bottom of the conduction band, and the lower curve shows the energy Ev at the edge of the valence band. As shown in FIGS. 8A and 8B, a well type potential is formed in the active layer portion. When a positive voltage is applied to the p-clad layer 706 and a negative voltage is applied to the n-clad layer 702 having this quantum well structure, the electron barrier is lowered and holes and electrons are easily moved. Therefore, holes, which are the majority carriers in the p region, move to the n region, and electrons, which are the majority carriers in the n region, move to the p region. Applying a voltage in this way is called applying a forward bias. The movement of holes and electrons is called diffusion. In particular, applying energy from the outside to diffuse the energy is called injection.

When electrons and holes respectively flow toward the active layer in FIG. 8A, a barrier is generated between the active layer and the cladding layer. Therefore, the injected electrons proceed from the upper left side of the figure to the center and are confined in the active layer without diffusion. The same applies to holes, which are confined in the active layer. Therefore, a current flows due to the recombination of electrons and holes in the active layer. The energy hv released when the electrons and holes are recombined becomes light.

The energy hv of the emitted light must be equal to or larger than the band gap Eg (act) when holes and electrons recombine.

FIG. 8B is a diagram illustrating the principle of operation of the LED in the detection mode. In the detection mode, a reverse bias voltage is applied in the LED direction. In the reverse bias, electrons move to the positive electrode and holes move to the negative electrode, so that no current flows unless the PN junction surface is irradiated with light. When the PN junction surface is irradiated with light, electrons and holes are generated, and a current flows as shown from the upper center side to the left side in the figure. Since the magnitude of the electric current is proportional to the energy hv of the emitted light, it can be used as an LED photodetector. Thus, by applying a forward bias voltage to the LED, the LED can be used in the light emission mode, and by applying a reverse bias voltage to the LED, it can be used as a photodetector in the detection mode.

Figure 9:
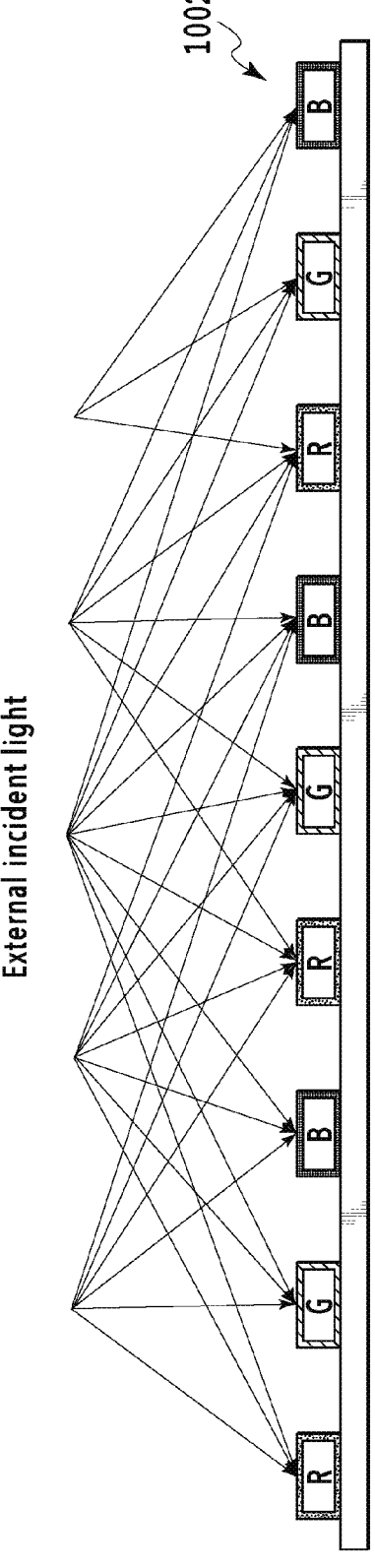
FIG. 9 is a diagram for explaining an operation of a passive detection mode in the pixel array.
Figure 10:
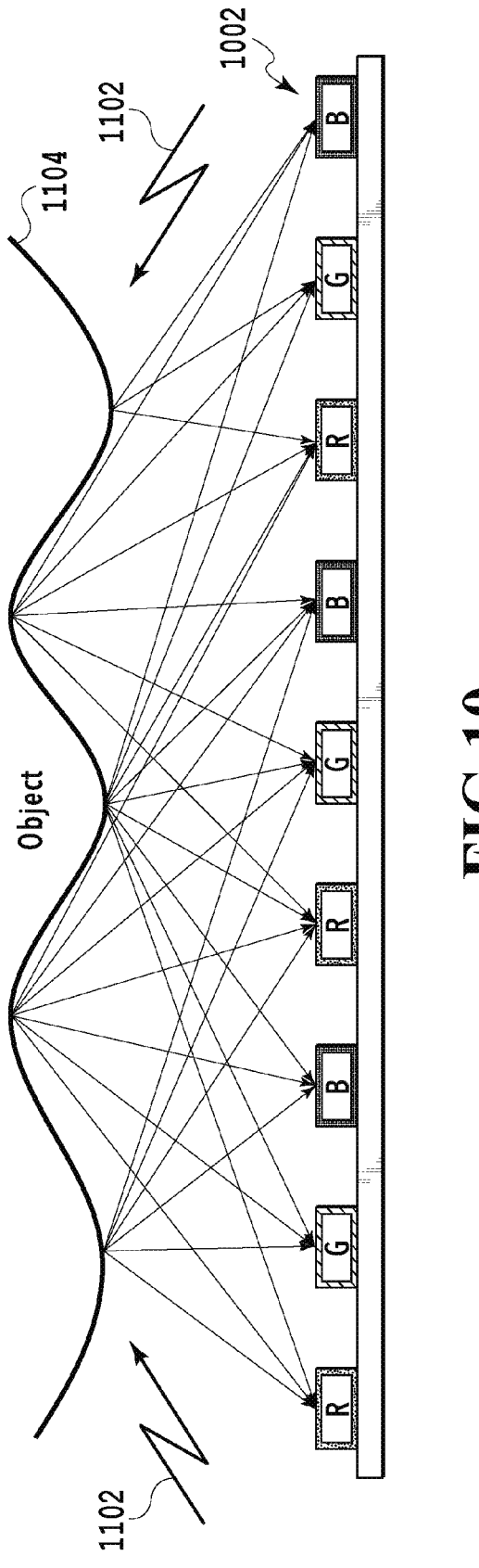
FIG. 10 is a diagram for explaining the operation of the passive detection mode in the pixel array.

Next, the operation of the pixel array 104 in the detection mode will be described with reference to FIGS. 9 to 11. In one embodiment, the pixel array 104 operates in two modes, a passive sensing mode and a mutual sensing mode.

Next, operations of the pixel array will be described. FIGS. 9 and 10 are diagrams for explaining an operation of the pixel array in the passive detection mode. FIG. 9 is a cross-sectional view of a one-dimensional array of LEDs in the pixel array. Each LED 1002 receives light from outside in various directions and outputs a signal having an intensity corresponding to the total of the received light. FIG. 10 shows an operation of detecting the shape of an object in the passive detection mode. In the figure, the target object 1104 is close to the pixel array 104. When the target object 1104 is irradiated with light 1102 from the outside, the target object 1104 reflects the light 1102. The reflected light is incident on the LED 1002. Each LED 1002 receives the reflected light from the target object 1104 from various directions and outputs a signal having an intensity corresponding to the total of the received light.

Figure 11:
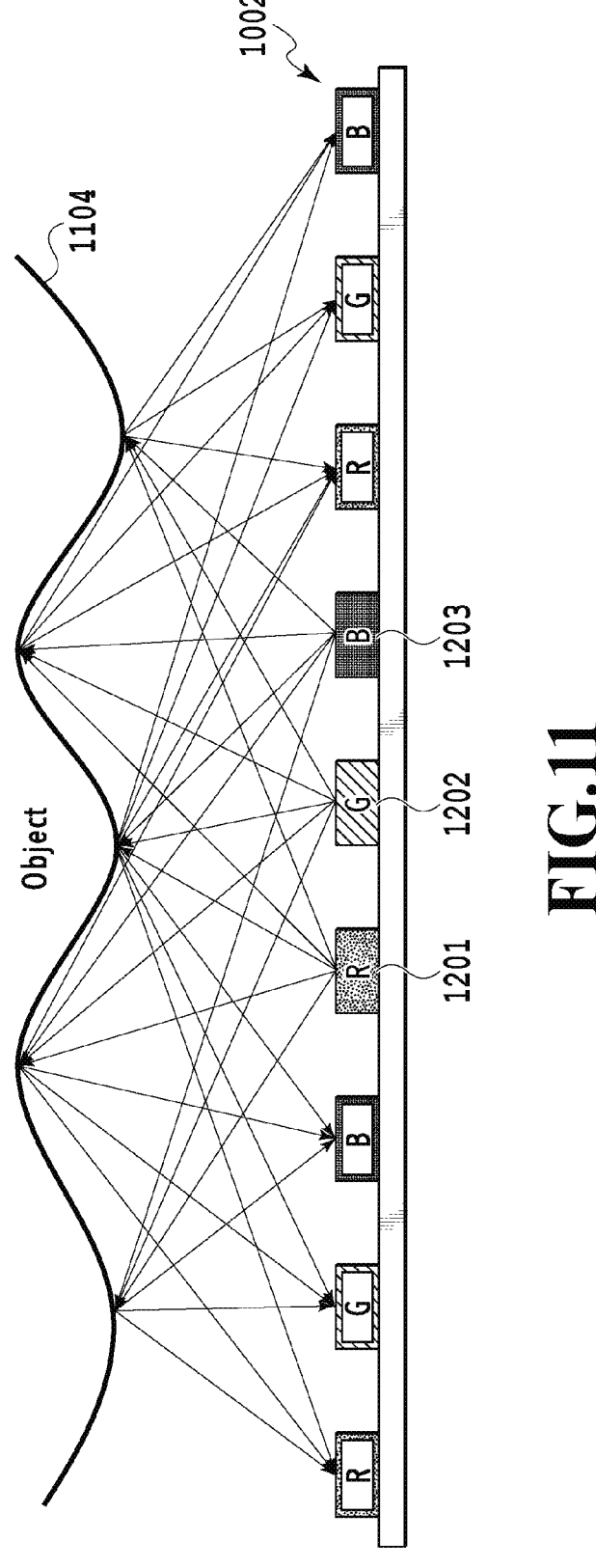
FIG. 11 is a diagram for explaining an operation in a mutual detection mode.

FIG. 11 is a diagram for explaining the operation in the mutual detection mode. In the mutual detection mode, among the one-dimensional array of LEDs 1002, specific LEDs, that is, LED (R) 1201, LED (G) 1202, and LED (B) 1203 are caused to emit light. When the target object 1104 is irradiated with the light from the LED (R) 1201, the LED (G) 1202, and the LED (B) 1203, the target object 1104 reflects the light. The reflected light is incident on the LED 1002. Each LED 1002 receives the reflected light from the target object 1104 from various directions and outputs a signal having an intensity corresponding to the total of the received light.

Next, with reference to FIG. 12 to FIG. 16, a multispectral optical detection method according to this embodiment will be described.

Figure 12:
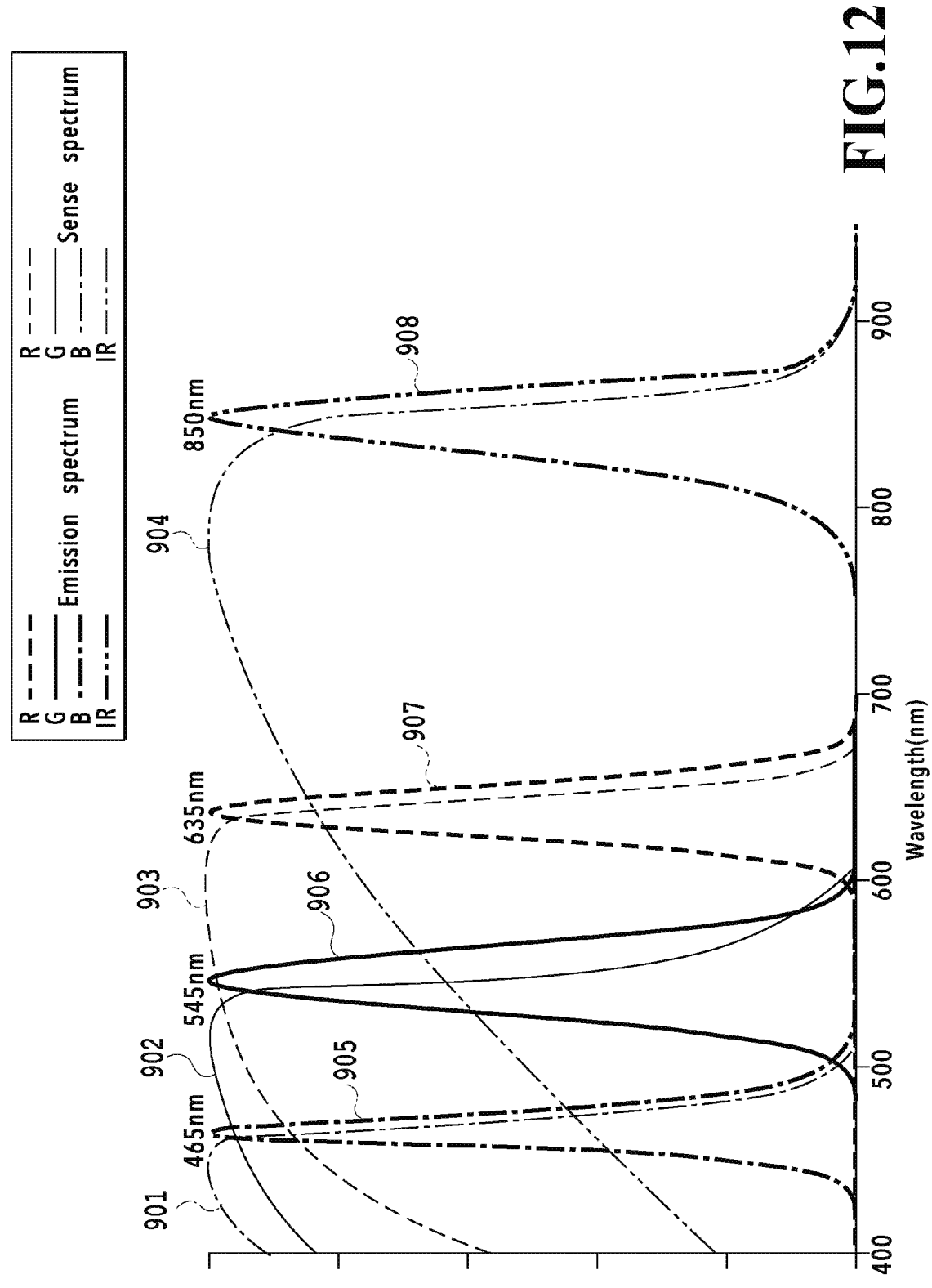
FIG. 12 is profiles of emitting and sensing intensity of LEDs according to an embodiment.

FIG. 12 illustrates a chart illustrating profiles of emitting and sensing intensity of LEDs according to an embodiment. A subpixel may include an LED that emits light at a wavelength corresponding to its color. The semiconductor material used for the LED may determine its color emission. For example, a blue emitting LED may be formed from indium gallium nitride (InGaN). An IR emitting LED may be formed from gallium arsenide (GaAs). As shown in the emission intensity profile of FIG. 12, peak emission intensity for blue (905), green (906), red (907) and IR (908) emitting LEDs occurs at different wavelengths, 465 nm, 545 nm, 635 nm and 850 nm, respectively. It should be noted that the above described materials used for the LEDs are only for example, and therefore various materials may be used for emission of lights having desired wavelengths. Accordingly, the above wavelengths are also exemplary values defined by selection of materials. The emissive curves for the blue (905), green (906), red (907) and IR (908) emitting LEDs are shown as a narrow peak that drastically increases and decreases around certain wavelengths.

On the other hand, sensing wavelength ranges of LEDs differ from emission wavelength ranges. The LED can sense a wide range of light below its emission wavelength. However, the LED's ability to sense light significantly decreases at wavelengths higher than its own emissive wavelength. Four sense curves 901, 902, 903 and 904 represent the sensing intensities of the blue, green, red and IR emitting LEDs, respectively. For example, the sensing curve for a blue emitting LED 901, which is much wider than blue emission 905, covers wavelengths below its emissive wavelength. The blue emitting LED drastically decreases in sensing ability for wavelengths near the emissive wavelength of 465 nm and higher, as shown in FIG. 12. Ultimately, its sensing ability is very weak at the highest wavelength end of the emissive curve.

As described with reference to FIG. 12, the wavelength of light that can be detected in the detection mode is less than or equal to the wavelength of light emitted in the emission mode.

In this embodiment, an LED that emits red light (hereinafter, referred to as LED (R)), an LED that emits green light (hereinafter, referred to as LED (G)), an LED that emits blue light (hereinafter, referred to as LED (B)) and an LED that emits IR light (hereinafter, referred to as LED (IR)) are each grouped. Each of the LEDs thus grouped is called a light emitting element group. Then, the processing unit 108 detects the wavelength of the specific region based on the output values of the signals output from the light emitting elements included in at least two groups of the plurality of light emitting element groups.

Figure 13:
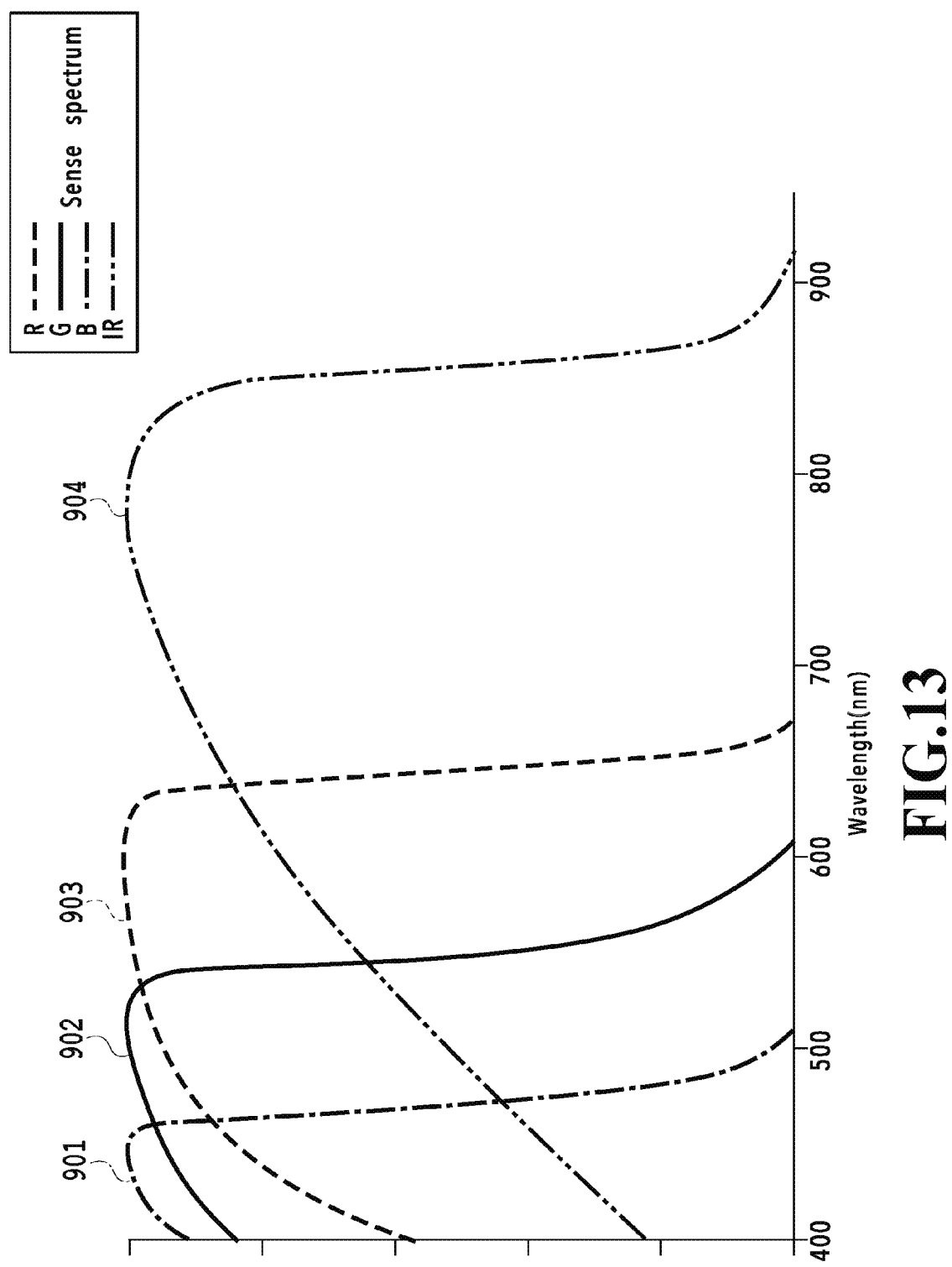
FIG. 13 is spectrums in which light is detected using light emitting element groups among spectrums shown in FIG. 9.
Figure 14:
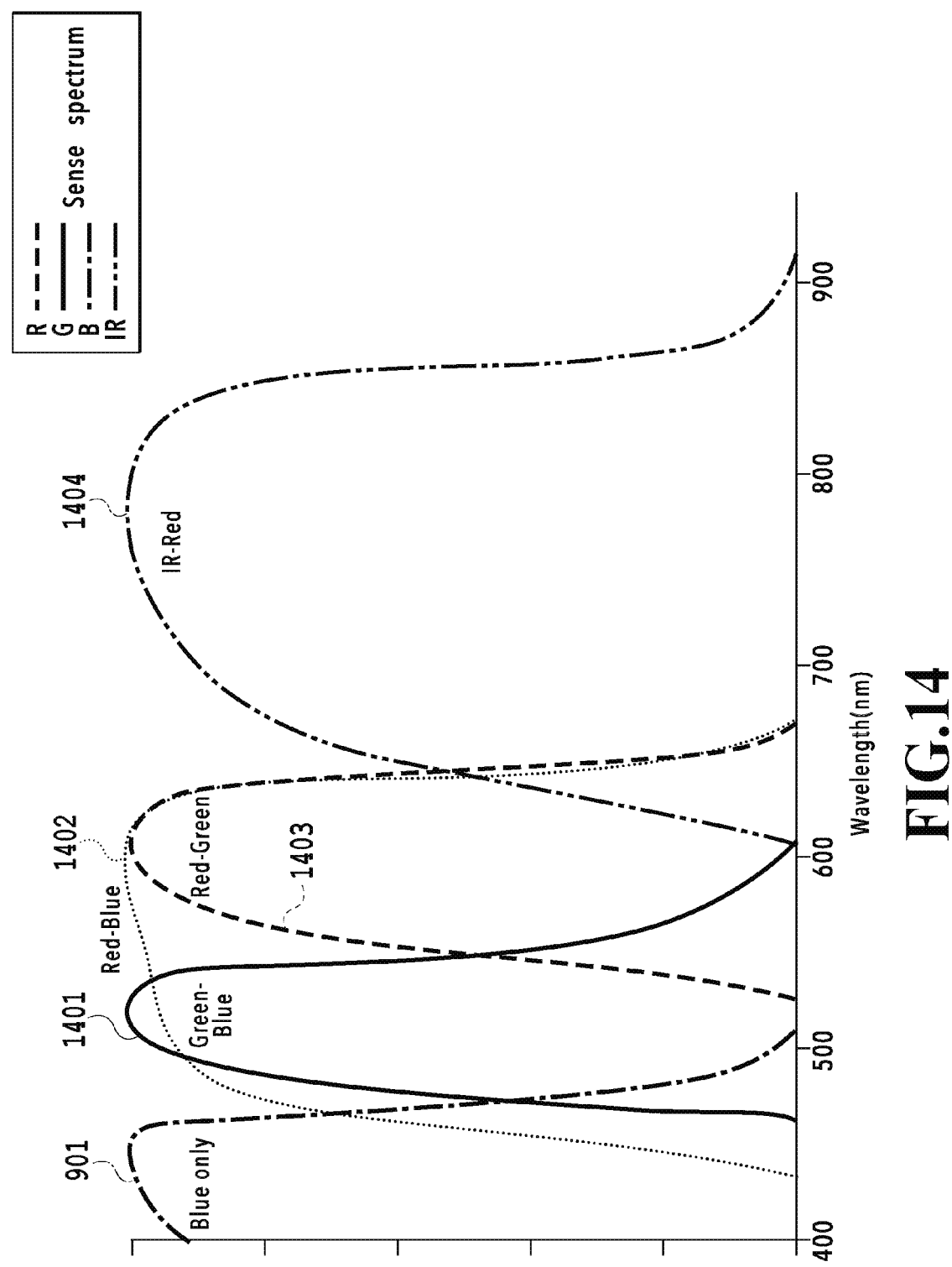
FIG. 14 is a diagram showing a method of detecting light having a wavelength in a specific region.

FIG. 13 shows spectrums in which lights are detected using the LED (R) light emitting element group, the LED (G) light emitting element group, the LED (B) light emitting element group and the LED (IR) light emitting element group among the spectrums shown in FIG. 12. In the figure, a curve 901 corresponds to the spectrum detected by using the LED (B) light emitting element group. A curve 902 corresponds to the spectrum detected by using the LED (G)

light emitting element group. A curve 903 corresponds to the spectrum detected by using the LED (R) light emitting element group. Further, a curve 904 corresponds to the spectrum detected by using the LED (IR) light emitting element group. FIG. 14 is a diagram showing a method of detecting light having a wavelength in a specific region by using two light emitting element groups. In the example shown in FIG. 14, the blue spectrum is obtained based only on the output value of the detection signal output from the light emitting element group of LED (B).

Also, the red spectrum is obtained based on the output value of the detection signals output from the light emitting element group of LED (G) and the light emitting element group of LED (R). Specifically, a spectrum 1403 is obtained by subtracting the spectrum 902 obtained based on output values of detection signals from the light emitting element group of LED (G) from the spectrum 903 obtained based on output values of detection signals from the light emission element group of LED (R) (hereinafter, the spectrum obtained in this way is referred to as spectrum Red-Green). The spectrum Red-Green 1403 has the wavelength and shape similar to a spectrum 907 obtained based on the output value of the detection signal output from the LED (R) light emitting element group. In this way, the spectrum Red-Green 1403 of red light can be detected.

Similarly, the spectrum 901 obtained based on the detection signal output from the light emitting element group of LED (B) is subtracted from the spectrum 902 obtained based on the detection signal output from the light emitting element group of LED (G). Thus, the spectrum Green-Blue 1401 is obtained. It is clear that spectrum Green-Blue 1401 has the wavelength and shape similar to the spectrum 906 obtained based on the output value of the detection signal output from the light emitting element group of LED (G). In this way, the spectrum of green light can be detected.

Similarly, the spectrum 903 obtained based on the detection signal output from the light emitting element group of LED (R) is subtracted from the spectrum 904 obtained based on the detection signal output from the light emitting element group of LED (IR). Thus, the spectrum IR-Red 1404 is obtained. It is clear that spectrum IR-Red 1404 has the wavelength and shape similar to the spectrum 908 obtained based on the output value of the detection signal output from the light emitting element group of LED (G). In this way, the spectrum of green light can be detected.

Further, the spectrum 901 obtained based on the detection signal output from the light emitting element group of LED (B) is subtracted from the spectrum 903 obtained based on the detection signal output from the light emitting element group of LED (R). Thus, the spectrum Red-Blue 1402 is obtained. It is clear that spectrum Red-Blue 1402 has the wavelength and shape similar to a combination of spectrum 906 and 907 obtained based on the output value of the detection signal output from the light emitting element groups of LED (G) and LED (R). This means that the spectrum Red-Blue 1402 corresponds to a yellow spectrum. In this way, the spectrum of yellow light can be detected.

According to the present embodiment, desired spectrum can be obtained by subtraction between two light emitting element groups. The above-described subtraction method can be summarized in the following Table 1.

TABLE 1

| Subtraction Method (A − B) | | | | |
|---|---|---|---|---|
| | A | | | |
| | IR | Red | Green | Blue |
| B    IR | | | | |
| Red | IR | | | |
| Green | | Red | | |
| Blue | | Yellow | Green | |
| None | | | | Blue |

Second Embodiment

In the second embodiment of the present invention, the write controller 101 and the write driver 112 drive the light emission of at least a part of the light emitting element group of one color, and the controller 103 processes the signal output from the light emitting element group of a color with a wavelength longer than or equal to the wavelength of the emitted color.

Figure 15:
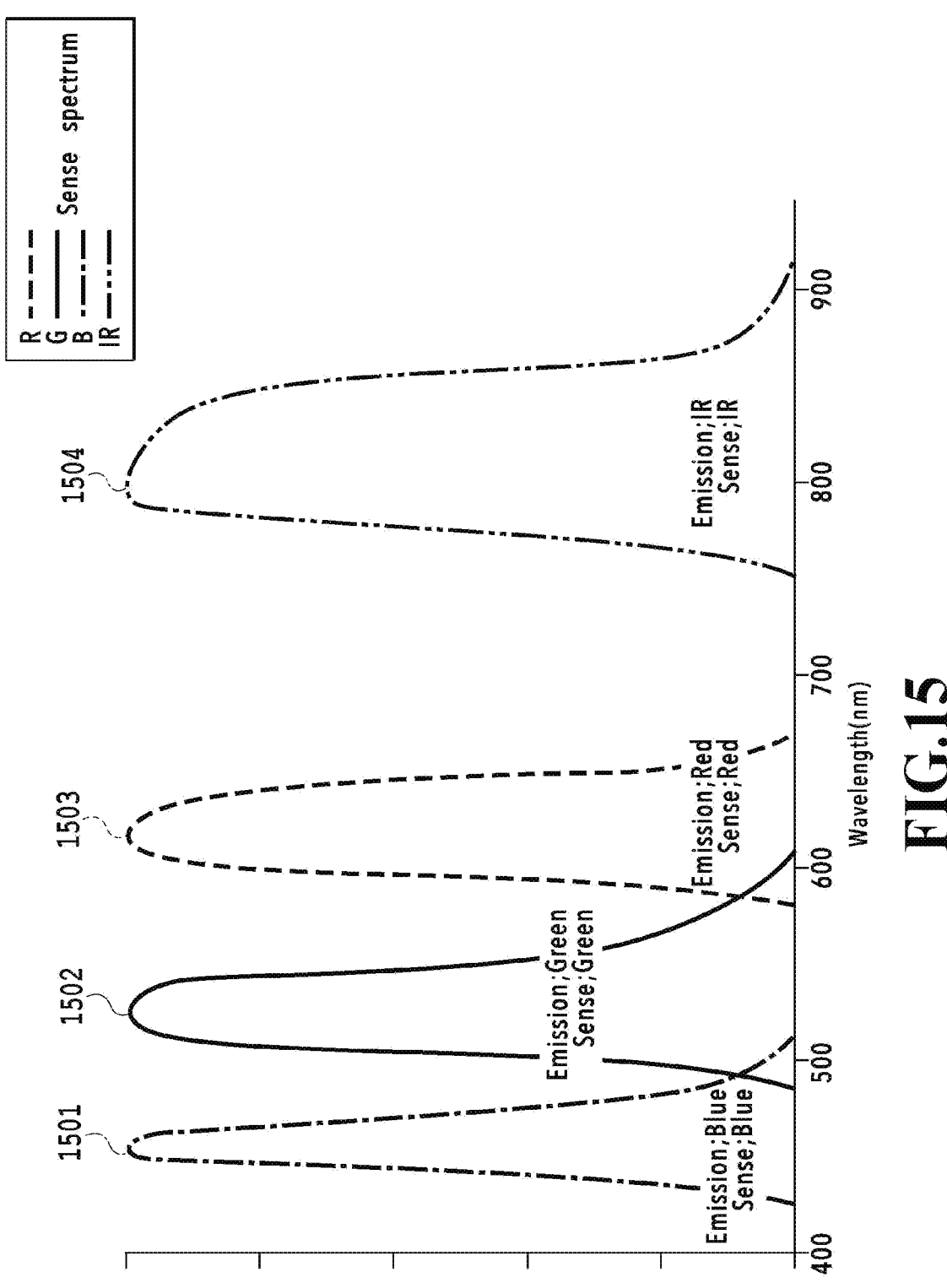
FIG. 15 is a diagram for explaining a detection operation according to an embodiment.

FIG. 15 is a diagram for explaining the detection operation according to this embodiment. When detecting blue light, the write controller 101 and the write driver 112 drive a part of the light emitting element group of the LED (B) to emit light. On the other hand, the sense controller 113 and the signal converter 106 drive at least a part of the light emitting element groups of the LED (B), LED (G), LED (R) and LED (IR) to detect light. The processing unit 108 obtains the spectrum based on the output value of the detection signal output from the LED for detection. In FIG. 15, the spectrum 1501 is obtained by emission of the LED (B) and sensing by LED (B). It corresponds to the blue spectrum.

Similarly, when detecting green light, the write controller 101 and the write driver 112 drive a part of the LED (G) light emitting element group to emit light. On the other hand, the sense controller 113 and the signal converter 106 drive at least a part of the light emitting element groups of the LED (G), LED (R) and LED (IR) to detect light. The processing unit 108 obtains the spectrum 1502 based on the output value of the detection signal output from the LED for detection. In FIG. 15, the spectrum 1502 is obtained by emission of the LED (G) and sensing by LED (G). It corresponds to the green spectrum.

Also, when detecting red light, the write controller 101 and the write driver 112 drive a part of the light emitting element group of the LED (R) to emit light. On the other hand, the sense controller 113 and the signal converter 106 drive at least a part of the light emitting element groups of the LED (R) and LED (IR) to detect light. The processing unit 108 obtains the spectrum 1503 based on the output value of the detection signal output from the LED for detection. The spectrum 1503 is obtained by emission of the LED (R) and sensing by the LED (R). It corresponds to the red spectrum.

Further, when detecting red light, the write controller 101 and the write driver 112 drive a part of the light emitting element group of the LED (IR) to emit light. On the other hand, the sense controller 113 and the signal converter 106 drive the other part of the light emitting element group of the LED (IR) to detect light. The processing unit 108 obtains the spectrum 1504 based on the output value of the detection signal output from the LED (IR). The spectrum 1504 corresponds to the IR spectrum.

Figure 16:
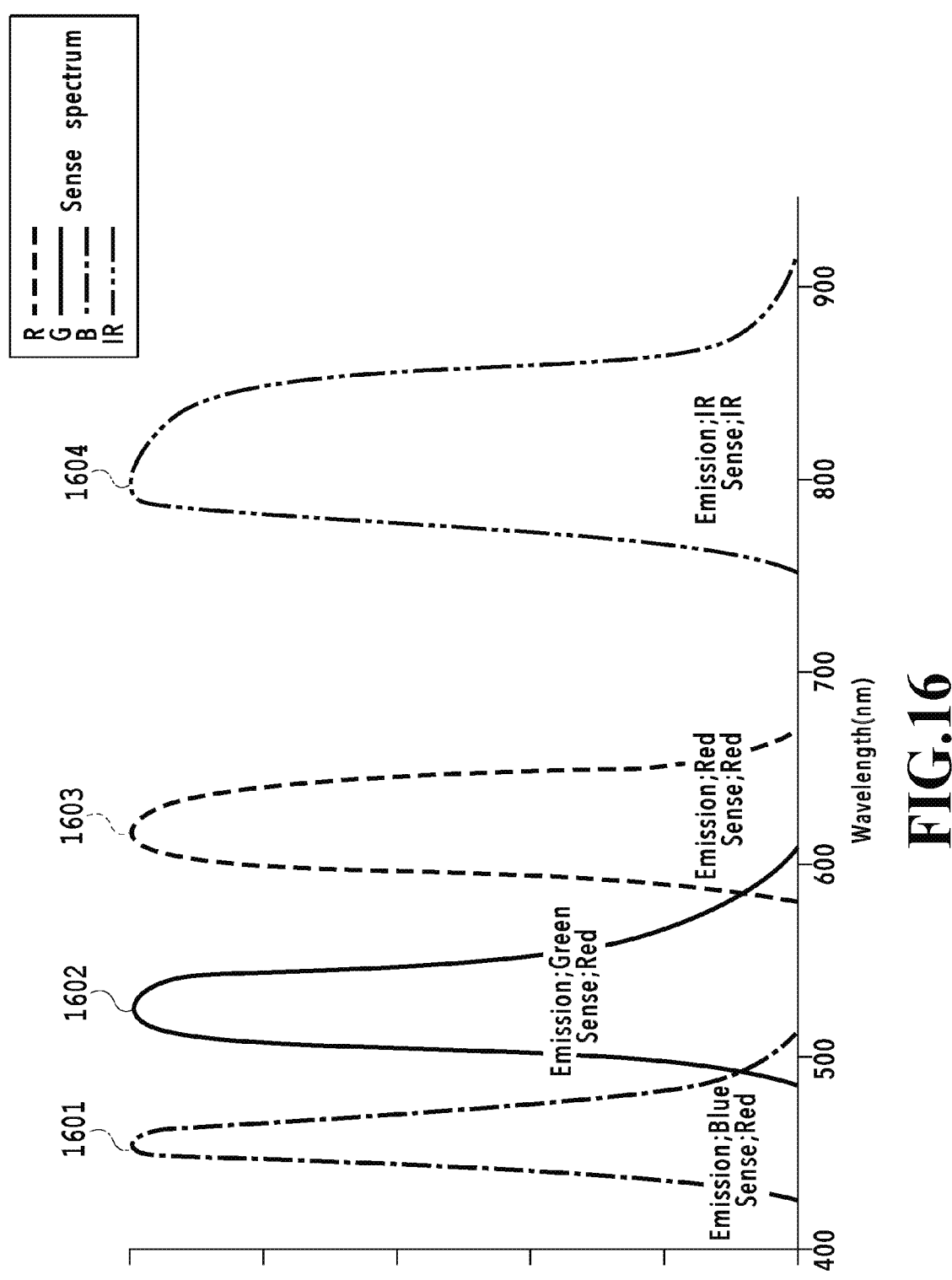
FIG. 16 is a diagram for explaining the detection operation according to an embodiment.

FIG. 16 is a diagram for explaining the detection operation according to one embodiment. When detecting blue light, the write controller 101 and the write driver 112 drive the light emitting element group of the LED (B) to emit light. On the other hand, the sense controller 113 and the signal converter 106 detect the light by driving the light emitting element group of the LED (R). The processing unit 108 obtains the spectrum 1601 based on the detection signal output from the LED (R). The spectrum 1601 corresponds to the blue spectrum 905.

Similarly, when detecting green light, the write controller 101 and the write driver 112 drive the light emitting element group of the LED (G) to emit light. On the other hand, the light emitting element group of the LED (R) is driven to detect light. The processing unit 108 obtains the spectrum 1602 based on the detection signal output from the LED (R). The spectrum 1602 corresponds to the green spectrum 906.

According to the present embodiment, desired spectrum can be obtained by a combination of emission of a single color light emitting element group and sensing by the same or different light emitting element group. The above-described combination method can be summarized in the following Table 2.

TABLE 2

| Combination Method (Single Color Emission) | | | | | |
|---|---|---|---|---|---|
| | | Single Color Emission | | | |
| | | IR | Red | Green | Blue |
| Sense | IR | IR | Red | Green | Blue |
| | Red | | Red | Green | Blue |
| | Green | | | Green | Blue |
| | Blue | | | | Blue |

Third Embodiment

In one embodiment, two color LEDs may be controlled to emit light. For example, the write controller 101 and the write driver 112 drive a part of the light emitting element group of the LED (R) and a part of the light emitting element group of the LED (G) to emit light. On the other hand, the sense controller 113 and the signal converter 106 drive the other part of the light emitting element group of the LED (R) to detect light. The processing unit 108 obtains the blue spectrum based on the output value of the detection signal output from the LED (R) for detection. This spectrum corresponds to a yellow spectrum. In one embodiment, the sense controller 113 and the signal converter 106 drive the other part of the light emitting element group of the LED (G) to detect light. The processing unit 108 obtains the green spectrum based on the output value of the detection signal output from the LED for detection.

Similarly, the write controller 101 and the write driver 112 drive a part of the light emitting element group of the LED (R) and a part of the light emitting element group of the LED (B) to emit light. On the other hand, the other part of the light emitting element group of the LED (R) is driven to detect light. The processing unit 108 obtains the spectrum based on the output value of the detection signal output from the LED (R) for detection. This spectrum corresponds to a magenta spectrum. In this way, the spectrum of magenta light can be detected. In one embodiment, the sense controller 113 and the signal converter 106 drive at least a part of the light emitting element group of the LED (B) or LED (G) to detect light. The processing unit 108 obtains the blue spectrum based on the output value of the detection signal output from the LED for detection.

Similarly, the write controller 101 and the write driver 112 drive a part of the light emitting element group of the LED (G) and a part of the light emitting element group of the LED (B) to emit light. On the other hand, the other part of the light emitting element group of the LED (B) is driven to detect light. The processing unit 108 obtains the spectrum based on the output value of the detection signal output from the LED (B). This spectrum corresponds to the blue spectrum. In one embodiment, the sense controller 113 and the signal converter 106 drive at least a part of the light emitting element group of the LED (R) or LED (G) to detect light. The processing unit 108 obtains the cyan spectrum based on the output value of the detection signal output from the LED for detection.

According to the present embodiment, desired spectrum ban be obtained by a combination of emission of two-color light emitting element groups and sensing by a light emitting element group. The above-described combination method can be summarized in the following Table 3.

TABLE 3

Combination Method (Two-Color Emission)

| | | Two-Color Emission | | |
| --- | --- | --- | --- | --- |
| | | Yellow (Red + Green) | Magenta (Red + Blue) | Cyan (Green + Blue) |
| Sense | Red | Yellow | Magenta | Cyan |
| | Green | Green | Blue | Cyan |
| | Blue | | Blue | Blue |

In this way, by emitting the LED of two colors and detecting the light reflected from the target by the other LED, the light of the wavelength in the specific region can be detected.

According to the embodiment described above, multispectral photosensing is possible by providing a common photosensor array on the display substrate. Such common photosensor array on a display substrate makes it possible to apply for multiple features, which obtain multiple spectrum sensing. The multiple spectrum sensing has major benefit as follows.

For example, by applying the multispectral photosensing according to the above-described embodiment to a display device, it is possible to perform authentication processing using a fingerprint authentication sensor using the entire screen, a Vein sensor, or the like. In the case of fingerprint authentication, the spectrum of visible light can be used for authentication. In particular, the detection process using blue light is desirable because it can avoid noise due to Vein. In the case of authentication by the Vein sensor, authentication can be performed by the wavelength of Near IR for redox hemoglobin in Vein.

In addition, this embodiment can be used for a touch sensor of an interactive display device. Also, the present disclosure can be applied to an ambient sensor composed of a proximity sensor and an ambient light sensor. In this case, the proximity sensor may be realized by using LED (IR) for obtaining near-IR spectrum. According to the ambient sensor, it is possible to adjust display image color adjustment.

Further, the present disclosure can be applied to a heart rate monitor by functioning LEDs as the proximity sensor and a photoplethysmography sensor. In this case, it is preferably to use green spectrum for oxide hemoglobin at artery.

Still further, the present disclosure can be applied to LIFI (Light Fidelity) which is a wireless communication method for utilizing the light to transmit data at a mobile device having a display device.

The foregoing descriptions are merely specific implementation manners of the present invention, but are not intended to limit the protection scope of the present invention. Any variation or replacement readily figured out by a person skilled in the art within the technical scope disclosed shall fall within the protection scope of the present invention. Therefore, the protection scope of the present invention shall be subject to the protection scope of the claims.

The invention claimed is:

1. A display apparatus, comprising:
a plurality of light emitting elements;
a drive circuitry configured to drive light emission of the plurality of light emitting elements;
at least one processor; and
one or more memories coupled to the at least one processor and storing programming instructions for execution by the at least one processor to:
process signals output from the plurality of light emitting elements irradiated with light without emitting, wherein the plurality of light emitting elements include a plurality of light emitting element groups that emit light with different wavelengths; and
detect a predetermined wavelength based on output values of signals output from a light emitting element included in at least two groups of the plurality of light emitting element groups, wherein the at least two groups of the plurality of light emitting element groups comprise a first light emitting element group and a second light emitting element group, and wherein the predetermined wavelength is detected by subtracting an output value of the second light emitting element group from an output value of the first light emitting element group.

2. The display apparatus according to claim 1, wherein:
the drive circuitry is configured to drive a first portion of the plurality of light emitting elements to emit light; and
the one or more memories store the programming instructions for execution by the at least one processor to process a signal output from a second portion of the plurality of light emitting elements.

3. The display apparatus according to claim 1, wherein the plurality of light emitting element groups include at least two groups selected from a red light emitting element group, a green light emitting element group, a blue light emitting element group, and an infrared light emitting element group.

4. The display apparatus according to claim 3, wherein the one or more memories store the programming instructions for execution by the at least one processor to detect a red wavelength by subtracting an output value of the green light emitting element group from an output value of the red light emitting element group.

5. The display apparatus according to claim 3, wherein the one or more memories store the programming instructions for execution by the at least one processor to detect a green wavelength by subtracting an output value of the blue light emitting element group from an output value of the green light emitting element group.

6. The display apparatus according to claim 3, wherein the one or more memories store the programming instructions for execution by the at least one processor to detect a yellow wavelength by subtracting an output value of the blue light emitting element group from an output value of the red light emitting element group.

7. The display apparatus according to claim 3, wherein the one or more memories store the programming instructions for execution by the at least one processor to detect an infrared wavelength by subtracting an output value of the red light emitting element group from an output value of the infrared light emitting element group.

8. The display apparatus according to claim 3, wherein:
the drive circuitry is configured to drive light emission of a portion of the red light emitting element group and a portion of the green light emitting element group; and
the one or more memories store the programming instructions for execution by the at least one processor to detect a yellow wavelength based on an output value from another portion of the red light emitting element group.

9. The display apparatus according to claim 3, wherein:
the drive circuitry is configured to drive light emission of a portion of the red light emitting element group and a portion of the green light emitting element group; and
the one or more memories store the programming instructions for execution by the at least one processor to detect a green wavelength based on an output value from another portion of the green light emitting element group.

10. The display apparatus according to claim 3, wherein:
the drive circuitry is configured to drive light emission of a portion of the red light emitting element group and a portion of the blue light emitting element group; and
the one or more memories store the programming instructions for execution by the at least one processor to detect a magenta wavelength based on an output value from another portion of the red light emitting element group.

11. The display apparatus according to claim 3, wherein:
the drive circuitry is configured to drive light emission of a portion of the red light emitting element group and a portion of the blue light emitting element group; and
the one or more memories store the programming instructions for execution by the at least one processor to detect a blue wavelength based on an output value from the green light emitting element group or another portion of the blue light emitting element group.

12. The display apparatus according to claim 3, wherein:
the drive circuitry is configured to drive light emission of a portion of the green light emitting element group and a portion of the blue light emitting element group; and
the one or more memories store the programming instructions for execution by the at least one processor to detect a cyan wavelength based on an output value from a portion of the red light emitting element group or another portion of the green light emitting element group.

13. The display apparatus according to claim 3, wherein:
the drive circuitry is configured to drive light emission of a portion of the green light emitting element group and a portion of the blue light emitting element group; and
the one or more memories store the programming instructions for execution by the at least one processor to detect a blue wavelength based on an output value from another portion of the blue light emitting element group.

14. A method of driving a display apparatus, comprising:
driving light emission of a plurality of light emitting elements;
processing signals output from the plurality of light emitting elements that are irradiated with light without emitting, wherein the plurality of light emitting elements include a plurality of light emitting element groups that emit light with different wavelengths; and
detecting a predetermined wavelength based on an output value of a signal output from a light emitting element included in at least two groups of the plurality of light emitting element groups, wherein the at least two groups of the plurality of light emitting element groups comprise a first light emitting element group and a second light emitting element group, and wherein the predetermined wavelength is detected by subtracting an output value of the second light emitting element group from an output value of the first light emitting element group.

15. The method according to claim 14, wherein:
driving the light emission of the plurality of light emitting elements comprises:
driving a first portion of the plurality of light emitting elements to emit light; and
processing the signals output from the plurality of light emitting elements comprises:
processing a signal output from a second portion of the plurality of light emitting elements.

16. The method according to claim 14, wherein the plurality of light emitting element groups include a red light emitting element group, a green light emitting element group, a blue light emitting element group, and an infrared light emitting element group.

17. The method according to claim 16, wherein processing the signals output from the plurality of light emitting elements comprises:
detecting a red wavelength by subtracting an output value of the green light emitting element group from an output value of the red light emitting element group.

18. The method according to claim 16, wherein processing the signals output from the plurality of light emitting elements comprises:
detecting a green wavelength by subtracting an output value of the blue light emitting element group from an output value of the green light emitting element group.

19. The method according to claim 16, wherein processing the signals output from the plurality of light emitting elements comprises:
detecting a yellow wavelength by subtracting an output value of the blue light emitting element group from an output value of the red light emitting element group.

20. The method according to claim 16, wherein processing the signals output from the plurality of light emitting elements comprises:
detecting an infrared wavelength by subtracting an output value of the red light emitting element group from an output value of the infrared light emitting element group.

* * * * *